United States Patent
Chellappan et al.

(10) Patent No.: US 10,606,772 B2
(45) Date of Patent: Mar. 31, 2020

(54) USB2 HIGH SPEED CONNECTION FOR TESTING

(71) Applicant: Intel Corporation, Santa Clara, CA (US)

(72) Inventors: Satheesh Chellappan, Folsom, CA (US); Kishore Kasichainula, Phoenix, AZ (US); Lay Cheng Ong, Georgetown (MY); Chee Lim Poon, Penang (MY); Harish G. Kamat, Gilbert, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/954,838

(22) Filed: Apr. 17, 2018

(65) Prior Publication Data

US 2019/0018802 A1   Jan. 17, 2019

(30) Foreign Application Priority Data

Jul. 14, 2017   (MY) .............................. PI2017702578

(51) Int. Cl.
   *G06F 9/4401*   (2018.01)
   *G06F 13/10*   (2006.01)
   *G06F 13/42*   (2006.01)

(52) U.S. Cl.
   CPC .......... *G06F 13/102* (2013.01); *G06F 9/4403* (2013.01); *G06F 13/4282* (2013.01); *G06F 2213/0042* (2013.01)

(58) Field of Classification Search
   None
   See application file for complete search history.

(56) References Cited

U.S. PATENT DOCUMENTS

2013/0290572 A1* 10/2013 Dalal .................... G06F 13/102
                                                        710/19

OTHER PUBLICATIONS

High-Speed Inter-Chip USB Electrical Specification, Sep. 23, 2007, www.usb.org, version 1.0, p. 12 (Year: 2007).*

* cited by examiner

*Primary Examiner* — Hyun Nam
(74) *Attorney, Agent, or Firm* — Jaffery Watson Mendonsa & Hamilton LLP

(57) ABSTRACT

In one example a Universal Serial Bus (USB) controller comprises at least one memory register to store one or more enumeration parameters for a USB connection with the USB controller and logic, at least partially including hardware logic, to detect a USB connection with a remote device via the USB connection, retrieve one or more connection enumeration parameters for the USB connection from the at least one memory register on the USB host controller, and implement a connection enumeration process using the one or more connection enumeration parameters retrieved from the memory register on the USB controller. Other examples may be described.

20 Claims, 6 Drawing Sheets

FIG. 1  Electronic Device 100

USB2 HIGH SPEED CONNECTION FOR TESTING

RELATED APPLICATIONS

This application claims priority to Malaysian Application No. PI2017702578 filed Jul. 14, 2017, entitled USB2 HIGH SPEED CONNECTION FOR TESTING. The entire disclosure of this document is incorporated by reference herein for all purposes.

BACKGROUND

The subject matter described herein relates generally to the field of electronic devices and more particularly to a Universal Serial Bus (USB) 2.X high speed connection.

A typical USB2 high speed (HS) signal enumeration is serialized and is incurred as overhead during USB connection with a HS Device. The signaling handshake of HS USB enumeration (e.g., Device ChirpK and Host KJ Chirps) can consume as much as 2.5 milliseconds (ms) to 8 ms. This latency is unnecessary in a closed system, e.g., a system form pre-silicon and post-silicon validation. USB2. This latency also represents a cost in HVM (High Volume Manufacturing), where every 1 ms of tester time could cost as much as millions of dollars.

Accordingly, techniques to implement high speed connections for USB devices may find utility.

BRIEF DESCRIPTION OF THE DRAWINGS

The detailed description is described with reference to the accompanying figures.

DETAILED DESCRIPTION

Described herein are exemplary systems and methods to implement detection of undocking for electronic devices. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

As described above, it may be useful to provide techniques to implement a low-cost USB2 high speed connection. To address this and other issues, the present disclosure describes techniques to implement a USB2 high speed connection in which pre-configured connection enumeration parameters may be stored in a register of a USB controller, e.g., a host controller and/or a device controller. When the USB controller detects a connection the pre-configured connection enumeration parameters may be retrieved from the register and used to implement a connection.

In some aspects the subject matter described herein provides a control mechanism to skip the conventional USB2 high-speed enumeration process, which requires handshaking operations with USB2 main link finite state machine (FSM), parallel interface engine (PIE) and the chirp controllers. The same protocol can be reused in a closed chassis system. In some examples the techniques may pre-configure the speed of operation for HS (high speed), FS (full speed) and LS (low speed) operation. In HVM (high volume manufacturing) a tester can bypass the HS enumeration and directly reach L0 state for HBP (high speed bypass) validation.

Figure 1:
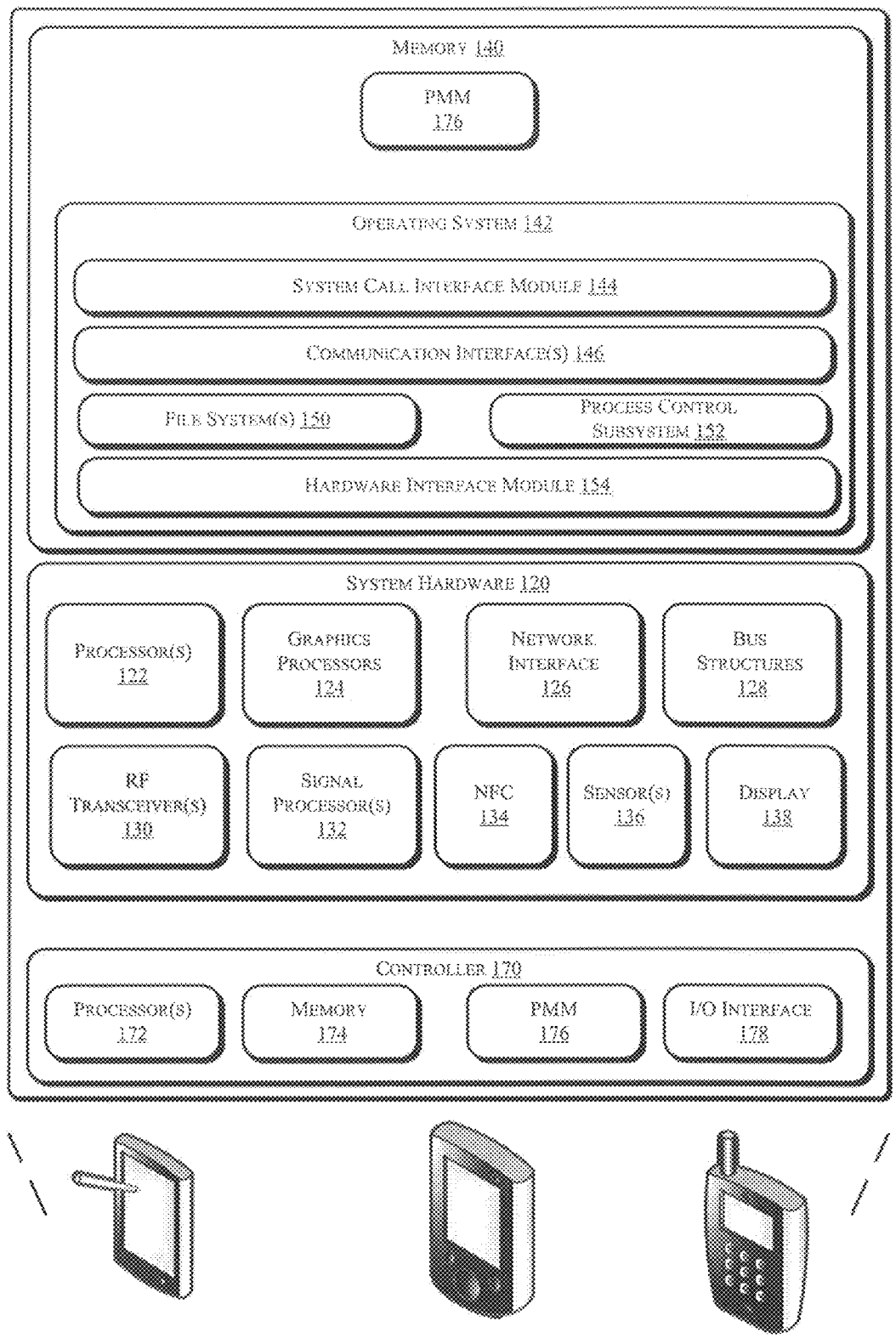
FIG. 1 is a schematic illustration of an electronic device which may be adapted to implement a USB2 high speed connection in accordance with some examples.

FIG. 1 is a schematic illustrations of an electronic device which may be adapted to implement a USB2 high speed connection in accordance with some examples. Referring first to FIG. 1, in various examples, electronic device 100 may include or be coupled to one or more accompanying input/output devices including a display, one or more speakers, a keyboard, one or more other I/O device(s), a mouse, a camera, or the like. Other exemplary I/O device(s) may include a touch screen, a voice-activated input device, a track ball, a geolocation device, an accelerometer/gyroscope, biometric feature input devices, and any other device that allows the electronic device 100 to receive input from a user.

The electronic device 100 includes system hardware 120 and memory 140, which may be implemented as random access memory and/or read-only memory. A file store may be communicatively coupled to electronic device 100. The file store may be internal to electronic device 100 such as, e.g., eMMC, SSD, one or more hard drives, or other types of storage devices. Alternatively, the file store may also be external to electronic device 100 such as, e.g., one or more external hard drives, network attached storage, or a separate storage network.

System hardware 120 may include one or more processors 122, graphics processors 124, network interfaces 126, and bus structures 128. In one embodiment, processor 122 may be embodied as an Intel® Atom processors, Intel® Atom™ based System-on-a-Chip (SOC) or Intel® Core2 Duo® or i3/i5/i7 series processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated onto the motherboard of electronic device 100 or may be coupled via an expansion slot on the motherboard or may be located on the same die or same package as the Processing Unit.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/ GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI), a High Speed Synchronous Serial Interface (HSI), a Serial Low-power Inter-chip Media Bus (SLIMbus®), or the like.

Electronic device 100 may include an RF transceiver 130 to transceive RF signals, a Near Field Communication (NFC) radio 134, and a signal processing module 132 to process signals received by RF transceiver 130. RF transceiver may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a WCDMA, LTE, general packet radio service (GPRS) interface (see, e.g., Guidelines on GPRS Handset Requirements, Global System for Mobile Communications/GSM Association, Ver. 3.0.1, December 2002).

Electronic device 100 may further include one or more sensors 136 such as a thermal sensor, a coupling sensor, or the like. Electronic device 100 may further include one or more input/output interfaces such as, e.g., a keypad 136 and a display 138. In some examples electronic device 100 may not have a keypad and use the touch panel for input.

Memory 140 may include an operating system 142 for managing operations of electronic device 100. In one embodiment, operating system 142 includes a hardware interface module 154 that provides an interface to system hardware 120. In addition, operating system 140 may include a file system 150 that manages files used in the operation of electronic device 100 and a process control subsystem 152 that manages processes executing on electronic device 100.

Operating system 142 may include (or manage) one or more communication interfaces 146 that may operate in conjunction with system hardware 120 to transceive data packets and/or data streams from a remote source. Operating system 142 may further include a system call interface module 144 that provides an interface between the operating system 142 and one or more application modules resident in memory 130. Operating system 142 may be embodied as a UNIX operating system or any derivative thereof (e.g., Linux, Android, etc.) or as a Windows® brand operating system, or other operating systems.

In some examples an electronic device may include a controller 170, which may comprise one or more controllers that are separate from the primary execution environment. The separation may be physical in the sense that the controller may be implemented in controllers which are physically separate from the main processors. Alternatively, the trusted execution environment may be logical in the sense that the controller may be hosted on same chip or chipset that hosts the main processors.

By way of example, in some examples the controller 170 may be implemented as an independent integrated circuit located on the motherboard of the electronic device 100, e.g., as a dedicated processor block on the same SOC die. In other examples the trusted execution engine may be implemented on a portion of the processor(s) 122 that is segregated from the rest of the processor(s) using hardware enforced mechanisms.

In the embodiment depicted in FIG. 1 the controller 170 comprises a processor 172, a memory module 174, a power management module (PMM) 176, and an I/O interface 178. In some examples the memory module 174 may comprise a persistent flash memory module and the various functional modules may be implemented as logic instructions encoded in the persistent memory module, e.g., firmware or software. The I/O module 178 may comprise a serial I/O module or a parallel I/O module. Because the controller 170 is separate from the main processor(s) 122 and operating system 142, the controller 170 may be made secure, i.e., inaccessible to hackers who typically mount software attacks from the host processor 122. In some examples portions of the power management module 176 may reside in the memory 140 of electronic device 100 and may be executable on one or more of the processors 122.

As described briefly above, a typical USB2 high speed (HS) signal enumeration is serialized and is incurred as overhead during USB connection with a HS Device. The signaling handshake of HS USB enumeration (e.g., Device ChirpK and Host KJ Chirps) can consume as much as 2.5 milliseconds (ms) to 8 ms. This latency is unnecessary in a closed system, e.g., a system form pre-silicon and post-silicon validation. USB2. This latency also represents a cost in HVM (High Volume Manufacturing), where every 1 ms of tester time could cost as much as millions of dollars.

Subject matter described herein addresses these and other issues by providing a control mechanism to enable a USB2 controller to skip the high-speed (HS) enumeration process and proceed directly to proper line termination after a USB Reset. In some examples, techniques described herein involve handshaking with USB2 main link finite state machine (FSM), parallel interface engine (PIE) and chirp controller. The same design principles can be reused in the HS Device Controller in a closed chassis system. In some examples the USB controller(s) may be pre-configured for one of HS (high speed), FS (full speed) and LS (low speed) operation. In HVM (high volume manufacturing) the tester can bypass the HS enumeration and directly reach L0 state for HBP (high speed bypass) validation.

There is no existing techniques to implement low-latency USB2 high speed enumeration. It will be recognized that techniques described herein may be applied to embedded USB (eUSB) or high-speed inter-chip (HSIC) devices, which are closed chassis systems. Techniques described herein can also be applied to on-board USB2 Devices with our without a physical layer like Bluetooth which are high-speed (HS) devices and to on-board devices which are proprietary and not exposed through a USB plug. This method can be applied to Phablet system on chip (SoC) devices, Internet of things (IoT) SoC devices and Peripheral Controller Hub (PCH) devices irrespective of USB2 PHY or type of USB connector.

Techniques described herein may be useful for down-load and execute (DnX) applications when USB2 is used as a boot device where boot latency is significant. In such examples typical latency saving are in the range of 9-100 milliseconds (ms). Techniques described herein are backward compatible to normal enumeration and operational flow when legacy devices are connected.

One advantage of the subject matter described herein is a reduction in high-speed (HS) enumeration time in high volume manufacturing (HVM) testing. But, invention can be extended to any USB2 HS capable devices in the market such as Camera, Storage, Bluetooth, LTE Modem, WLAN that can support this feature.

This invention enables faster product validation at HVM, by eliminating the latencies. Currently the Chirp modeling in HVM is complicated with different Chirp voltage levels from normal HS traffic. This feature eliminates the need to drive different Voltage level for Chip.

Figure 2:
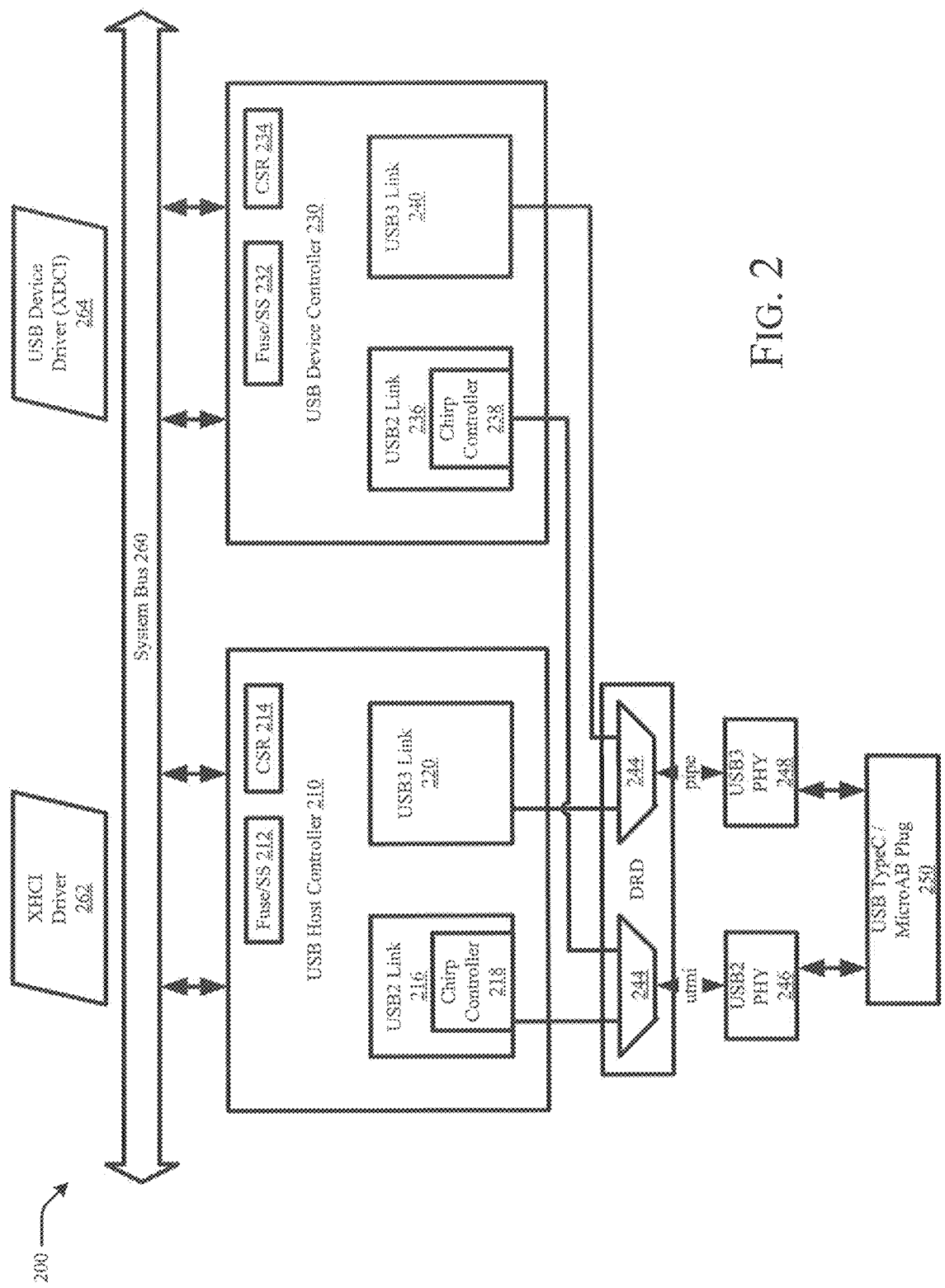
FIGS. 2-3 are schematic illustration of an architecture which may be adapted to implement a USB2 high speed connection in accordance with some examples.
Figure 3:
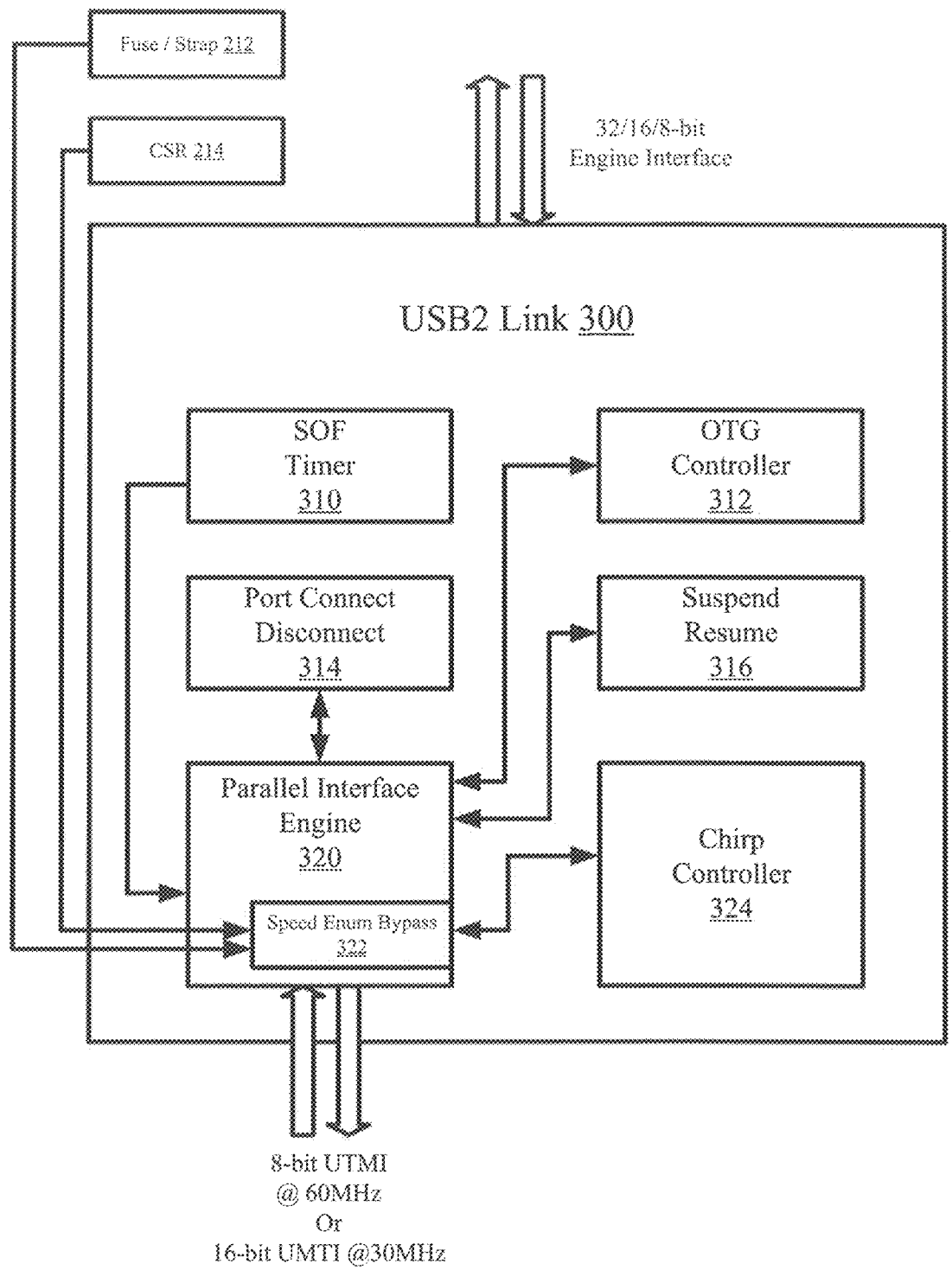

FIGS. 2-3 are schematic illustration of an architecture which may be adapted to implement a USB2 high speed connection in accordance with some examples. Referring to FIG. 2, in some examples an architecture 200 comprises a USB host controller 210 and a USB device controller 230 which are connected by a system bus 260.

In some examples the USB host controller 210 comprises a fused (or softstrap) 212 and may comprise one or more control status registers 214. USB host controller 210 may further comprise a USB2 link manager 216 which in turn comprises a chirp controller 218. USB host controller 210 may further comprise a USB3 link manager 220.

In some examples the USB device controller 230 also comprises a fused (or softstrap) 232 and may comprise one or more control status registers 234. USB device controller 230 may further comprise a USB2 link manager 236 which in turn comprises a chirp controller 238. USB device controller 230 may further comprise a USB3 link manager 240.

The outputs of the respective link managers 216, 220, 236, 240 may be input to a dual role device (DRD) module comprising multiplexers 244 which, in turn, provide a connection to a USB2 physical layer 246 or a USB3 physical layer 248 which are, in turn, connected to a USB plug 250.

FIG. 3 is a schematic illustration of a USB2 link manager 300 in accordance with embodiments. In some examples a USB2 link manager 300 may correspond to the link manger 216 or the link manager 236 depicted in FIG. 2. In some examples the link manager 300 comprises a start of frame (SoF) timer 310, an on-the-go (OTG) controller 312, a port connect/disconnect module 314, a suspend/resume module 316, and a chirp controller 324, all of which may be communicatively coupled to a parallel interface engine (PIE) 320.

Parallel interface engine 320 may comprise a speed enumeration bypass logic module 322 which receive inputs from the fuse/strap 212 and/or the control and status register (CSR) 214. In some examples the speed enumeration bypass logic module 322 comprises logic, at least partially including hardware logic, to implement a high speed enumeration bypass process.

Figure 4A:
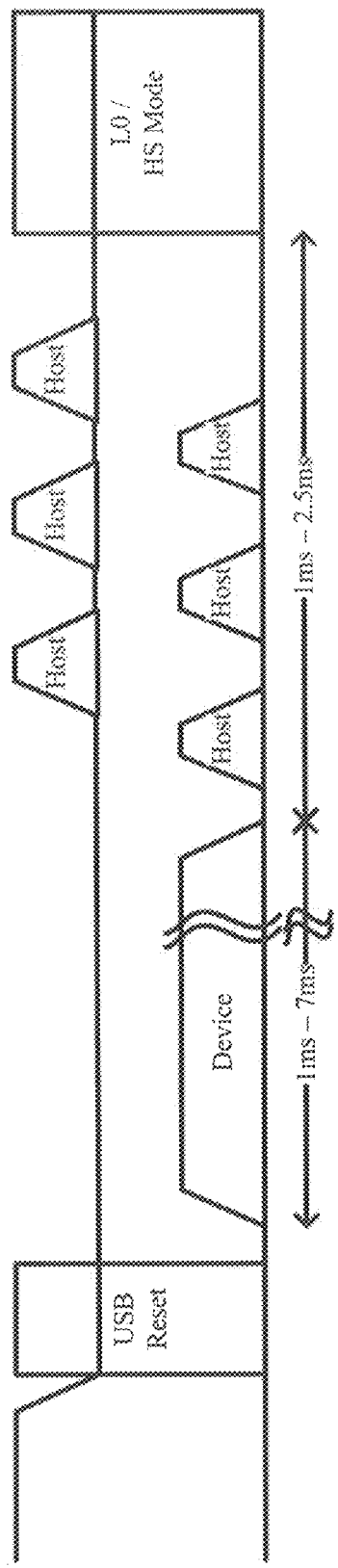
FIGS. 4A-4C illustrate timing diagrams in a USB2 high speed connection in accordance with some examples.
Figure 4B:
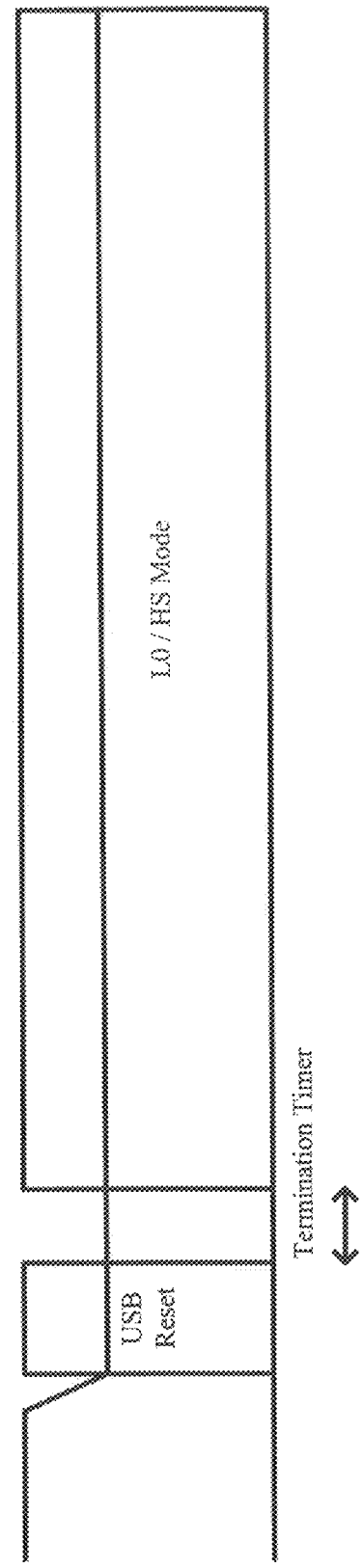
Figure 4C:
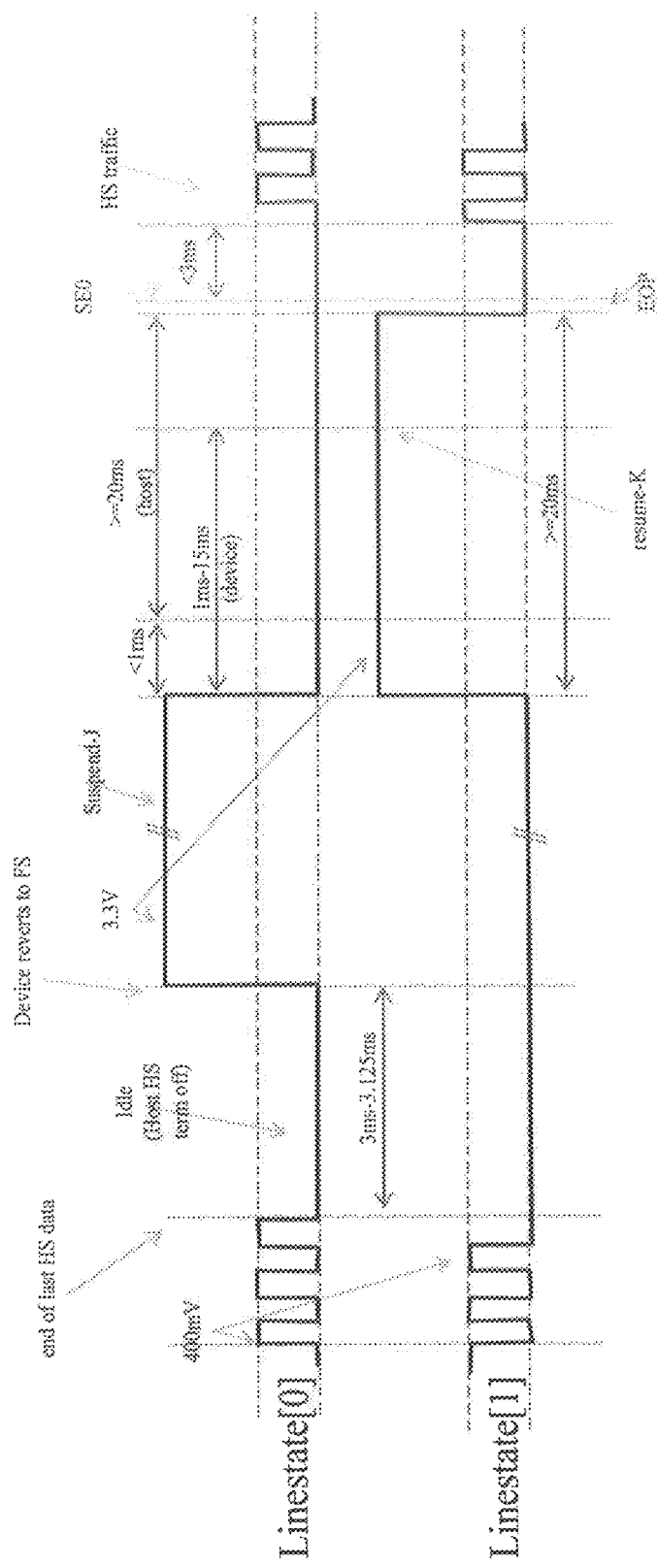
Figure 5:
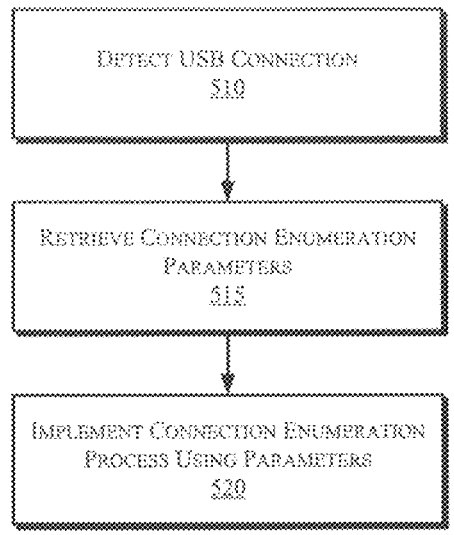
FIG. 5 is a flowchart illustrating operations in a method to implement a USB2 high speed connection in accordance with some examples.

Operation of the speed enumeration bypass module 322 will be explained with reference to FIGS. 4A-4C and FIG. 5. FIGS. 4A-4C illustrate timing diagrams in a USB2 high speed connection in accordance with some examples. FIG. 5 is a flowchart illustrating operations in a method to implement a USB2 high speed connection in accordance with some examples.

FIG. 4A illustrates a conventional USB2 high speed enumeration process. In a conventional high speed enumeration process a USB Reset is followed by Device Chirp driving Line K for 1 ms to 7 ms. After turn-around the Host drives a Chirp of 40 us to 60 us of Line K, and 40 us to 60 us of Line J. This Chirp KJ pair is repeated multiple times (typically >3 iterations) and until high speed (HS) termination are turned on. USB2 is half-duplex signaling and the turnaround during speed enumeration can take as much as 100 microseconds (µs) to 500 µs. There are two turnarounds before Device Chirp and before Host Chirp. Thus, the Chirp delay, the turnaround and actual termination delay can add more than 8 milliseconds (ms) in some cases.

Referring to FIG. 4B, in accordance with subject matter described herein a Chirp Controller 324 allows the termination to be enabled after USB Reset. The time delay may be pre-negotiated between the Host Controller 210 and Device Controller 230 in a USB link. In full speed (FS) and low speed (LS) mode the mode may be preconfigured and no chirp handshake is required, which to reduces latency in the enumeration process. Table indicates performance improvement in high speed (HS) mode by implementing techniques described herein.

TABLE I

| Timer | Max Latency | Source | Comment |
| --- | --- | --- | --- |
| Device Chirp | 7 ms | Device | Applicable for HS mode speed enumeration. |
| Turnaround | 100 us | — | D+/− driver turnaround from Device to Host |
| Host Chirp K 60 us | 500 us | Host | Host response of Line K for HS mode termination. |
| Host Chirp J 60 us | | | Host response of Line J for HS mode termination. |
| Host Chirp KJ pairs | | | Host response of Line KJ multiple pairs for HS mode termination. |
| Turnaround | 500 us | — | D+/− driver turnaround time to release Host Driver |
| Total | 8.1 ms | | |

FIG. 5 illustrates operations in an enhanced high speed enumeration process in accordance with principles described herein. Referring to FIGS. 4B and 5, at operation 510 a USB controller (i.e., a host controller 210 or a device controller 230) detects a USB connection. At operation 515 the controller retrieves the connection enumeration parameters from the Fuse/Softstrap and/or the CSR. At operation 520 the controller implements a connection enumeration process using the parameters retrieved from the Fuse/Softstrap and/or the CSR.

In some examples the parallel interface engine 320 detects the device connection and initiates an enumeration process by issuing a USB Reset. The USB Reset may be indicated by a single ended zero (SE0) where the line state of both D+ & D− are low. This may be followed by Device Chirp K, and Host Chirp KJ pairs. This technique allows both Host and Device to bypass the Chirps and directly enable the termination after programmed timer value.

The termination type is based on the mode of operation selected in Registers. In some examples the programmable timer is selected by a basic input/output system (BIOS) of an electronic device and may be set to a default minimum of 100 us for the USB2 PHY transceiver to switch. This timer is programmable and can be increase for debug or workaround purpose.

FIG. 4C illustrates a timing diagram for a suspend mode. Referring to FIG. 4C, a functional mode timer runs to approximately 30 ms to execute a suspend/resume test. Techniques described herein can reduce this time by a factor of 1000 into microsecond range. The interface with HVM and tester are in digital signaling (1.05 v), the timing diagram shows the timing at the Linestate[0]/[1] which are in analog (3.3 v).

The following pertains to further examples.

Example 1 is a universal serial bus (USB) controller comprising at least one memory register to store one or more enumeration parameters for a USB connection with the USB controller; and logic, at least partially including hardware logic, to detect a USB connection with a remote device via the USB connection; retrieve one or more connection enumeration parameters for the USB connection from the at least one memory register on the USB host controller; and implement a connection enumeration process using the one or more connection enumeration parameters retrieved from the memory register on the USB controller.

In Example 2, the subject matter of Example 1 can optionally include an arrangement wherein the controller comprises at least one of a fuse; a softstrap; or a control status register.

In Example 3, the subject matter of any one of Examples 1-2 can optionally include an arrangement wherein the connection enumeration parameters comprise at least one of a high speed enumeration mode parameter; a preconfigured port speed parameter; and a termination enable time parameter.

In Example 4, the subject matter of any one of Examples 1-3 can optionally include an arrangement wherein the termination enable time parameter is programmable via a basic input/output system (BIOS).

In Example 5, the subject matter of any one of Examples 1-4 can optionally include an arrangement wherein the logic is further configured to issue a USB reset; and enable termination of the USB controller after a time corresponding to the termination enable time parameter elapses.

Example 6 is a universal serial bus (USB) subsystem for use with an electronic device, the subsystem comprising at least one USB port; at least one memory register to store one or more enumeration parameters for a USB connection with the USB controller; and; and logic, at least partially including hardware logic, to detect a USB connection with a remote device via the USB connection; retrieve one or more connection enumeration parameters for the USB connection from the at least one memory register on the USB host controller; and implement a connection enumeration process using the one or more connection enumeration parameters retrieved from the memory register on the USB controller.

In Example 7, the subject matter of Example 6 can optionally include an arrangement wherein the controller comprises at least one of a fuse; a softstrap; or a control status register.

In Example 8, the subject matter of any one of Examples 6-7 can optionally include an arrangement wherein the connection enumeration parameters comprise at least one of a high speed enumeration mode parameter; a preconfigured port speed parameter; and a termination enable time parameter.

In Example 9, the subject matter of any one of Examples 6-8 can optionally include an arrangement wherein the termination enable time parameter is programmable via a basic input/output system (BIOS).

In Example 10, the subject matter of any one of Examples 6-9 can optionally include an arrangement wherein the logic is further configured to issue a USB reset; and enable termination of the USB controller after a time corresponding to the termination enable time parameter elapses.

Example 11 is an electronic device, comprising a processor; and a universal serial bus (USB) host controller comprising at least one memory register to store one or more enumeration parameters for a USB connection with the USB host controller; and logic, at least partially including hardware logic, to detect a USB connection with a USB device controller; retrieve one or more connection enumeration parameters for a USB connection with the USB device controller from the at least one memory register on the USB host controller; and implement a connection enumeration process with the USB device controller using the one or more connection enumeration parameters retrieved from the memory register on the USB host controller In Example 12, the subject matter of Example 11 can optionally include an arrangement wherein the controller comprises at least one of a fuse; a softstrap; or a control status register.

In Example 13, the subject matter of any one of Examples 11-12 can optionally include an arrangement wherein the connection enumeration parameters comprise at least one of a high speed enumeration mode parameter; a preconfigured port speed parameter; and a termination enable time parameter.

In Example 14, the subject matter of any one of Examples 11-13 can optionally include an arrangement wherein the termination enable time parameter is programmable via a basic input/output system (BIOS).

In Example 15, the subject matter of any one of Examples 11-14 can optionally include an arrangement wherein the logic is further configured to issue a USB reset; and enable termination of the USB controller after a time corresponding to the termination enable time parameter elapses.

Example 16 is a method to initiate a universal serial bus (USB) connection with a USB controller comprising detecting a USB connection with a remote device via the USB connection; retrieving one or more connection enumeration parameters for the USB connection from at least one memory register on the USB host controller; and implementing a connection enumeration process using the one or more connection enumeration parameters retrieved from the memory register on the USB controller.

In Example 17, the subject matter of Example 16 can optionally include an arrangement wherein the controller comprises at least one of a fuse; a softstrap; or a control status register.

In Example 18, the subject matter of any one of Examples 16-17 can optionally include an arrangement wherein the connection enumeration parameters comprise at least one of a high speed enumeration mode parameter; a preconfigured port speed parameter; and a termination enable time parameter.

In Example 19, the subject matter of any one of Examples 16-18 can optionally include an arrangement wherein the termination enable time parameter is programmable via a basic input/output system (BIOS).

In Example 20, the subject matter of any one of Examples 16-19 can optionally issuing a USB reset; and enabling termination of the USB controller after a time corresponding to the termination enable time parameter elapses.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A universal serial bus (USB) controller comprising:
    at least one memory register to store one or more enumeration parameters for a USB connection with the USB controller; and
    logic, at least partially including hardware logic, to:
        detect a USB connection with a remote device via the USB connection;
        retrieve one or more connection enumeration parameters for the USB connection from the at least one memory register on the USB host controller, the connection enumeration parameters comprising one or more pre-negotiated timing parameters for a USB enumeration process between the USB controller and the remote device; and
        implement a connection enumeration process using the one or more connection enumeration parameters retrieved from the memory register on the USB controller, wherein the connection enumeration process is to bypass a USB chirp handshake process between the USB controller and the remote device.

2. The USB host controller of claim 1, wherein the controller comprises:
    a control status register.

3. The USB controller of claim 1, wherein the connection enumeration parameters comprise at least one of:
    a high speed enumeration mode parameter;
    a preconfigured port speed parameter; and
    a line termination enable time parameter.

4. The USB controller of claim 3, wherein the line termination enable time parameter is programmable via a basic input/output system (BIOS).

5. The USB controller of claim 3, wherein the logic is further configured to:
    issue a USB reset; and
    enable line termination after a time corresponding to the line termination enable time parameter elapses.

6. A universal serial bus (USB) subsystem for use with an electronic device, the subsystem comprising:
    at least one USB port;
    at least one memory register to store one or more enumeration parameters for a USB connection with the USB controller; and
    logic, at least partially including hardware logic, to:
        detect a USB connection with a remote device via the USB connection;
        retrieve one or more connection enumeration parameters for the USB connection from the at least one memory register on the USB host controller, the connection enumeration parameters comprising one or more pre-negotiated timing parameters for a USB enumeration process between the USB controller and the remote device; and
        implement a connection enumeration process using the one or more connection enumeration parameters retrieved from the memory register on the USB controller, wherein the connection enumeration process is to bypass a USB chirp handshake process between the USB controller and the remote device.

7. The USB subsystem of claim 6, wherein the controller comprises:
    a control status register.

8. The USB subsystem of claim 6, wherein the connection enumeration parameters comprise at least one of:
    a high speed enumeration mode parameter;
    a preconfigured port speed parameter; and
    a line termination enable time parameter.

9. The USB subsystem of claim 8, wherein the line termination enable time parameter is programmable via a basic input/output system (BIOS).

10. The USB subsystem of claim 8, wherein the logic is further configured to:
    issue a USB reset; and
    enable line termination after a time corresponding to the termination enable time parameter elapses.

11. An electronic device, comprising:
    a processor; and
    a universal serial bus (USB) host controller comprising:

at least one memory register to store one or more enumeration parameters for a USB connection with the USB host controller; and logic, at least partially including hardware logic, to:
  detect a USB connection with a USB device controller;
  retrieve one or more connection enumeration parameters for a USB connection with the USB device controller from the at least one memory register on the USB host controller, the connection enumeration parameters comprising one or more pre-negotiated timing parameters for a USB enumeration process between the USB controller and the remote device; and
  implement a connection enumeration process with the USB device controller using the one or more connection enumeration parameters retrieved from the memory register on the USB host controller, wherein the connection enumeration process is to bypass a USB chirp handshake process between the USB controller and the remote device.

12. The electronic device of claim 11, wherein the host controller comprises:
  a control status register.

13. The electronic device of claim 11, wherein the connection enumeration parameters comprise at least one of:
  a high speed enumeration mode parameter;
  a preconfigured port speed parameter; and
  a line termination enable time parameter.

14. The electronic device of claim 13, wherein the line termination enable time parameter is programmable via a basic input/output system (BIOS).

15. The electronic device of claim 13, wherein the logic is further configured to:
  issue a USB reset; and
  enable line termination after a time corresponding to the termination enable time parameter elapses.

16. A method to initiate a universal serial bus (USB) connection with a USB controller comprising:
  detecting a USB connection with a remote device via the USB connection;
  retrieving one or more connection enumeration parameters for the USB connection from at least one memory register on the USB host controller, the connection enumeration parameters comprising one or more pre-negotiated timing parameters for a USB enumeration process between the USB controller and the remote device; and
  implementing a connection enumeration process using the one or more connection enumeration parameters retrieved from the memory register on the USB controller, wherein the connection enumeration process is to bypass a USB chirp handshake process between the USB controller and the remote device.

17. The method of claim 16, wherein the controller comprises:
  a control status register.

18. The method of claim 16, wherein the connection enumeration parameters comprise at least one of:
  a high speed enumeration mode parameter;
  a preconfigured port speed parameter; and
  a line termination enable time parameter.

19. The method of claim 18, wherein the line termination enable time parameter is programmable via a basic input/output system (BIOS).

20. The method of claim 18, further comprising:
  issuing a USB reset; and
  enabling line termination of the USB controller after a time corresponding to the termination enable time parameter elapses.

* * * * *